US011677746B2

(12) United States Patent
Mannengal et al.

(10) Patent No.: US 11,677,746 B2
(45) Date of Patent: Jun. 13, 2023

(54) DEVICE CAPABILITY MODEL SHARING (71) Applicant: Microsoft Technology Licensing, LLC, Redmond, WA (US)

(72) Inventors: Arun Ramadasan Mannengal, Sammamish, WA (US); Madhavan Kesavan, Redmond, WA (US); Hanumantha Rao Kommalapati, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 24 days.

(21) Appl. No.: 17/085,195

(22) Filed: Oct. 30, 2020

(65) Prior Publication Data

US 2022/0141214 A1 May 5, 2022

(51) Int. Cl.
*G06F 21/44* (2013.01)
*G06F 21/78* (2013.01)
*H04L 9/40* (2022.01)
*G06F 21/62* (2013.01)

(52) U.S. Cl.
CPC ...... *H04L 63/0853* (2013.01); *H04L 63/0876* (2013.01); *H04L 63/105* (2013.01)

(58) Field of Classification Search
None
See application file for complete search history.

(56) References Cited

U.S. PATENT DOCUMENTS

| | | | |
|---|---|---|---|
| 2018/0109395 A1* | 4/2018 | Berdy | H04L 63/08 |
| 2018/0119975 A1 | 5/2018 | Park et al. | |
| 2018/0309786 A1* | 10/2018 | Apelewicz | H04W 12/04 |
| 2018/0331916 A1* | 11/2018 | Damaggio | G06F 9/547 |
| 2019/0138678 A1 | 5/2019 | Young et al. | |
| 2020/0097493 A1 | 3/2020 | Gawrys et al. | |
| 2020/0169549 A1* | 5/2020 | Smith | H04L 67/141 |
| 2020/0221296 A1* | 7/2020 | Jiang | H04L 41/0806 |
| 2020/0259654 A1* | 8/2020 | Barnes | H04L 9/3213 |
| 2021/0152341 A1* | 5/2021 | Park | H04L 9/0861 |
| 2021/0152545 A1* | 5/2021 | Park | H04L 63/0823 |
| 2021/0272690 A1* | 9/2021 | Behuria | A61B 5/201 |
| 2021/0377735 A1* | 12/2021 | Latour | H04W 12/03 |

FOREIGN PATENT DOCUMENTS

EP 3528110 A1 8/2019

OTHER PUBLICATIONS

Identifying, authenticating and authorizing smart objects and end users to cloud services in Internet of Things. Beltran. Elsevier. (Year: 2018).*

(Continued)

*Primary Examiner* — Venkat Perungavoor (57) ABSTRACT

The device capability model (DCM) sharing system disclosed herein includes one or more computer implemented instructions including receiving a request from a device for access to the DCM, generating a request to a token issuing authority to request a device identification token; evaluating the device identification token to determine the device's DCM access level; communicating the device identification token with the device's capability model access level to a DCM repository; receiving the DCM from the DCM repository; and providing the device an access to the DCM.

20 Claims, 7 Drawing Sheets (56) References Cited

OTHER PUBLICATIONS

Towards data sharing economy on Internet of Things: a semantic for telemetry data. Halim. Springer. (Year: 2022).*
Device Identification Interoperability in Heterogeneous IoT Platforms. Koo. MDPI. (Year: 2019).*
Identity in the Internet-of-Things (IoT): New Challenges and Opportunities. Lam. Srpinger. (Year: 2016).*
Muchmore, Michael, "Microsoft Brings Plug and Play to the Internet of Things", Retrieved from: https://in.pcmag.com/news/130287/microsoft-brings-plug-and-play-to-the-internet-of-things. May 8, 2019, 5 Pages.
"International Search Report and Written Opinion Issued in PCT Application No. PCT/US21/044860", dated Oct. 2021, 15 Pages.

* cited by examiner

DEVICE CAPABILITY MODEL SHARING

BACKGROUND

Smart home devices are becoming prevalent in many home settings. Whether in the form of a smart TV, sound system, curtains, refrigerator, oven, garage door, washing machine, dryer, coffee pot, light bulb, smoke detector, thermostat, or the like, users enjoy being able to monitor and control their smart home devices remotely from other devices. In this manner, a user can warm their home, lock their front door, start dinner, play music, monitor food levels, or the like, from a remote location within or outside the home. This adds convenience and saves time for individuals busy with other life activities. Such smart devices are commonly referred to as devices connected to the "interne of things" (IoT), with the IoT being generally defined as technology that enables the interconnection of everyday objects to send and receive data for the real-world use and operation of such objects. Device modeling may be used to simplify the development and deployment of IoT devices through explicit interaction contracts that enable reuse and establish ecosystems of IoT devices and application services across cloud solutions.

SUMMARY

The device capability model (DCM) sharing system disclosed herein includes one or more computer implemented instructions including receiving a request from a device for access to the DCM, generating a request to a token issuing authority to request a device identification token; evaluating the device identification token to determine the device's DCM access level; communicating the device identification token with the device's capability model access level to a DCM repository; receiving the DCM from the DCM repository; and providing the device an access to the DCM.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Other implementations are also described and recited herein.

DETAILED DESCRIPTIONS

The IoT is a network of physical devices or "things" embedded with electronics, software, and sensors which enables these objects to collect and exchange data between themselves and between other computing devices. Example "things" include connected home appliances, sensors in automobiles, biochips, and the like. These devices communicate with other devices, servers, and computers across one or more networks and may even form and participate in mesh networks.

Device modeling may be used to simplify the development and deployment of IoT devices through explicit interaction contracts that enable reuse and establish ecosystems of IoT devices and application services across Cloud solutions. Model interfaces may be used to express the interaction constraints by describing device capabilities and allowing devices to be deployed, remotely configured and operated from a service by enabling strict guard rails on device code.

In various implementations, these models may be stored and then need to be securely shared across multiple organizations who use it in their cloud or specifically with a limited set of partners. Implementations disclosed herein provide the capability to securely and safely share device models, which is important for the growth of IoT device ecosystems. In addition, various implementations disclosed herein also validate the integrity of the device models by maintaining a signature against a model in a registry.

The technology disclosed herein solves a technical solution of sharing device capability models across disparate cloud-based IoT device management systems such that these systems can communicate with each other using predefined contracts that are shared with them in a safe and secure manner. The device capability model sharing in the manner disclosed herein allows IoT devices to be implemented without requiring the devices to carry model definitions embedded therein. Furthermore, the device capability model sharing in the manner disclosed herein also decouples access control decision making and therefore reduces use of valuable compute resources on the cloud-based IoT device management systems.

Figure 1:
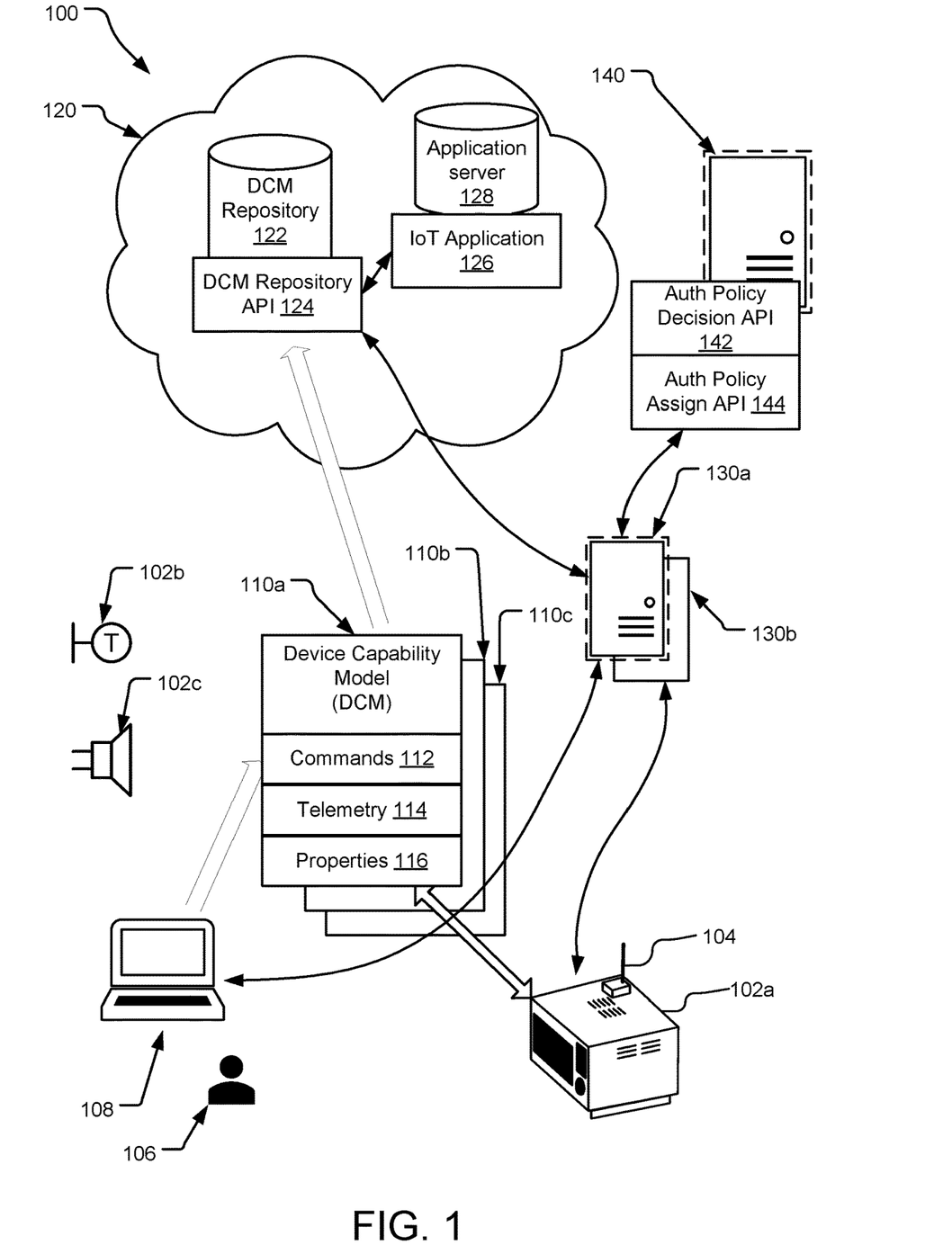
FIG. 1 illustrates an example block diagram of a device capability model (DCM) sharing system 100 disclosed herein.

FIG. 1 illustrates a block diagram of a device capability model sharing system 100 disclosed herein. The device capability model (DCM) sharing system 100, also referred to herein as the device model sharing system 100, provides a secure and temper-proof mechanism for sharing DCMs across various cloud gateways. In one implementation, one or more of the DCMs may define how various devices interact with various applications. For example, a cloud-based application may use such a DCM.

For example, the DCM sharing system discloses a DCM 110a that defines how a microwave 102a interacts with an IoT application 126. The IoT application 126 may be implemented on a cloud-based application server 128. While the illustrated implementation discloses DCMs for a microwave 102a configured as an IoT device, each of various other devices, such as a thermostat 102b or a speaker 102c, may also have their own DCMs 110b, 110c, etc., (collectively referred by DCMs 110). The DCMs 110 may be part of device templates that defines the characteristics and behaviors of a type of device that connects to your application. For example, the device template defines the telemetry that a device sends so that an IoT application 126 can create visualizations that use the correct units and data types.

The DCMs may have various fields that define how a device interacts with the IoT application 126. For example, the DCM 110a defines various commands 112 that the microwave 102a accepts. Such commands may include turning on and off the microwave 102a, controlling temperature of the microwave 102a, controlling the time period for the on time, etc. The DCM 110a may also include a telemetry field 114 that defines how often the microwave 102a communicates with the IoT application 126 in an on state, in an off state, etc. The telemetry field 114 may also define how the microwave 102a communicates using a wireless access point 104, such as a Bluetooth antenna, a Wi-Fi access point, etc.

As another example, the DCM 110a also includes a properties field 116 that defines other properties of the microwave 102a. Such properties may include, for example, make and year of the microwave 102a, the cubic feet size of the microwave 102a, power usage level of the microwave 102a, type of processor used in the microwave 102a, etc. In one implementation, the properties field 116 specifies access termination period for various IoT applications 126 to the IoT devices. For example, the properties field 116 may specify that an IoT application 126 that allows a manufacturer of the microwave to access the microwave 102a may access the microwave 102a for only twenty-four hours after provisioning the microwave.

The DCMs 110 may be generated by a DCM developer 106 using a computing device 108. The DCM sharing system 100 allows the DCM developer 106 to upload the DCM to a DCM repository, or a DCM database, 122 that may be configured on a cloud-based network 120. For example, DCM repository 122 may communicate using a DCM repository API 124. Thus, for example, the DCM developer 106 may be a developer for the company producing the microwave 102a and may upload the DCM 110a to the DCM repository 122 so that applications such as the IoT application 126 may use the DCM 110a to communicate with the microwave 102a. The IoT application 126 may be an IoT or device management application that can be used by various users to access and control one or more IoT devices, such as the microwave 102a, the thermostat 102b, the speaker 102c, etc. Similarly, developers for the thermostat 102b and the speaker 102c may also develop and upload the DCMs 102b, 102c to the DCM repository 122.

The DCM sharing system 100 also includes a token service 140 that is configured to provide access tokens for various users and applications to access APIs and other protected resources. Specifically, the token service 140 may be used to protect access to the DCM repository 122 and the DCM repository API 124 by various other entities, such as the IoT application 126, IoT devices 102, DCM developer 106, etc. In one implementation, the token service 140 may issue JSON Web Tokens (JWTs) to such entities. A JWT is a compact, URL-safe means of representing claims to be transferred between two parties. However, in alternative implementations, other forms of security tokens may be used. The token service 140 may be accessed by an authorization policy decision API 142 and an authorization policy assignment API 144.

In the implementation of the DCM sharing system disclosed herein, the DCM developer 106 communicates the DCM model 110a to the DCM repository API 128 via a cloud gateway 130a along with an access token identifying the DCM developer 106. The cloud gateway 130a uses the access token from the DCM developer 106 to verify the access privilege of the DCM developer 106 by communicating the access token to the token service 140 via the authorization policy decision API 142.

Once the DCM 110 is uploaded to the DCM repository 122, the developer 106 may share the model 110 with various other pre-specified entities with specified access privileges. For example, the DCM developer 106 may specify that an entity on a specific cloud gateway namespace1 has "read" privilege for the model 110, whereas another entity on another cloud gateway namespace2 has read and write privilege for the model 110. Such access privileges are communicated to the token service 140 via the authorization policy assignment point API 144 of the token service 140.

The IoT devices, such as the microwave 102a, may connect with the cloud gateway 130b to request access to a DCM from the DCM repository 122. Specifically, the microwave 102s may send a request for access the DCM 110a on the DCM repository 122 along with an access token identifying the microwave 102a. In response, the cloud gateway 130b may access the token service 140 via the authorization policy decision point API 142 to determine the access privileges for the microwave 102a to the DCM 110a stored on the DCM repository 122. After evaluating the access privileges, the cloud gateway 130b may access the DCM repository API 124 to request access to the model 110a on the DCM repository 122. In response, the DCM repository API 124 may access the authorization policy decision API 142 to determine the level of privileges for the microwave 102a and after evaluating the access privilege communicate the DCM 110a to the cloud gateway 130b. In turn, the cloud gateway 130b stores the DCM 110a in its cache and grants access to the DCM 110a to the microwave 102a. If a DCM requested by the microwave 102a is not in the cache of the cloud gateway 130b, the cloud gateway 130b may get the requested DCM from the DCM repository 122.

Figure 2:
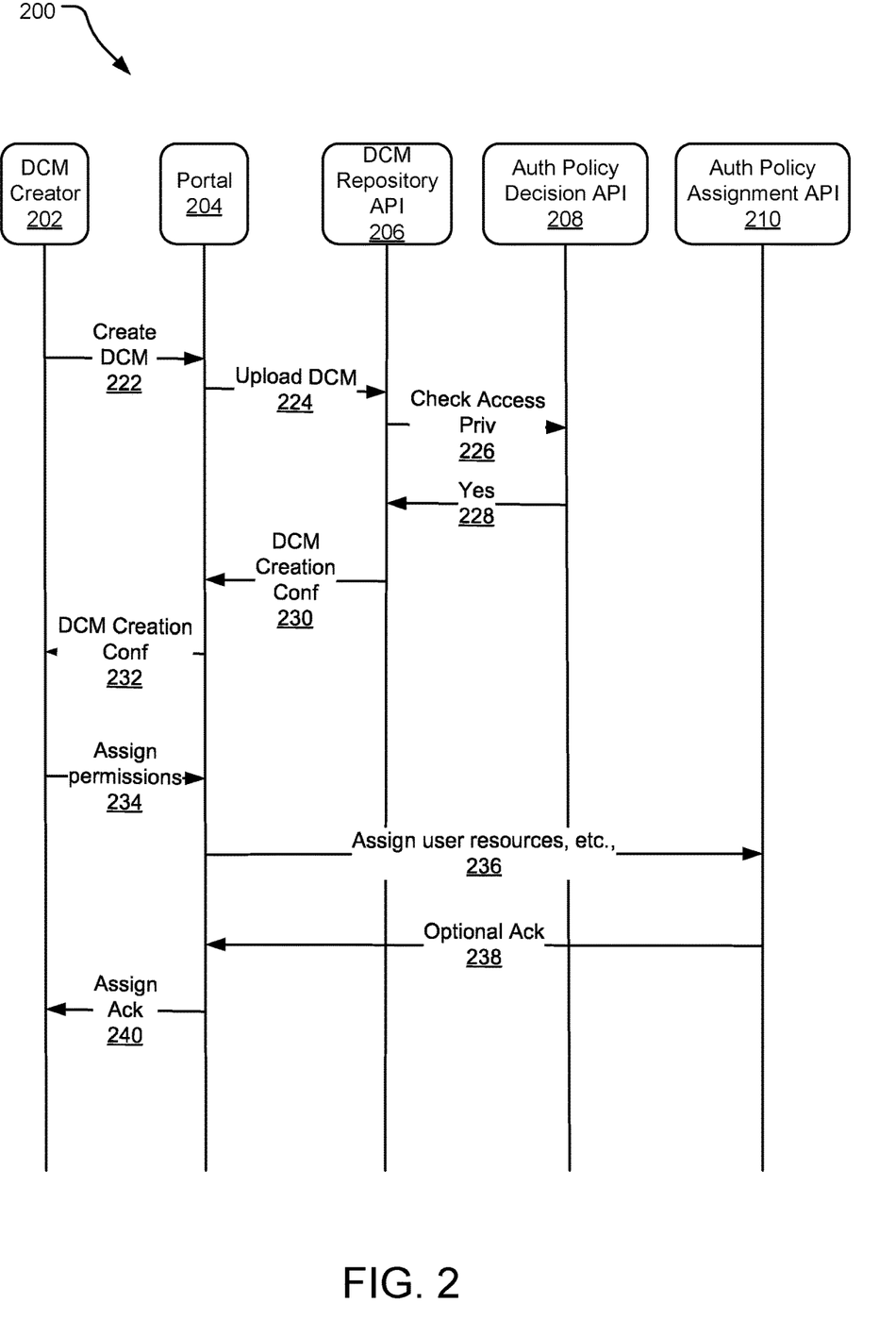
FIG. 2 illustrates an example sequence diagram for uploading DCMs to a DCM repository.

FIG. 2 illustrates a sequence diagram 200 for uploading device capability models to device model repository. Specifically, the sequence diagram 200 illustrates various actions for a DCM creator 202 to upload a DCM to a DCM repository and assign various permission levels to various entities' access to the DCM stored in the DCM repository. At 222, the DCM creator 202 creates a DCM and communicates with a portal or cloud gateway (referred to hereinafter as the portal 204) to upload the DCM to a DCM repository. At 224, the portal 204 communicates a command, such as a "put" command, to a DCM repository API 206 to upload the DCM to the DCM repository.

In response, the DCM repository API 206 communicates with an authorization policy API 208 to determine the access privileges of the DCM creator 202 to the DCM repository. For example, the authorization policy API 208 may be an API that allows access to an access token service. If the DCM creator 202 has access privilege as communicated at 228, at 230, the DCM repository API 206 communicates a confirmation of such access privilege to the portal 204. Subsequently, the portal 204 communicates the successful creation and uploading of the DCM to the DCM repository to the DCM creator 202.

Upon receiving such confirmation, at 234 the DCM creator 202 may communicate assignment of permissions to the DCM on the DCM repository. Subsequently, at 236 the portal communicates such DCM permissions to an authorization policy assignment API 210. For example, the authorization policy assignment API 210 may be an API that allows access to an access token service. At 236, the authorization policy assignment API 210 may send an optional acknowledgement to the portal 204, which may communicate such acknowledgement to the DCM creator 202 at 240.

In one implementation, a lightweight fingerprint of the DCM is also maintained at the portal 204 or at the DCM creator 202. Such fingerprint of the DCM may be used to check integrity of a DCM stored on the DCM repository at a later stage. For example, the portal 204 may request the DCM repository API to check an integrity of the fingerprint stored on the portal cache 204. As a result, the portal 204 is able to provide trusted validation and prevents fake DCMs when such DCMs are distributed across various stores.

Figure 3:
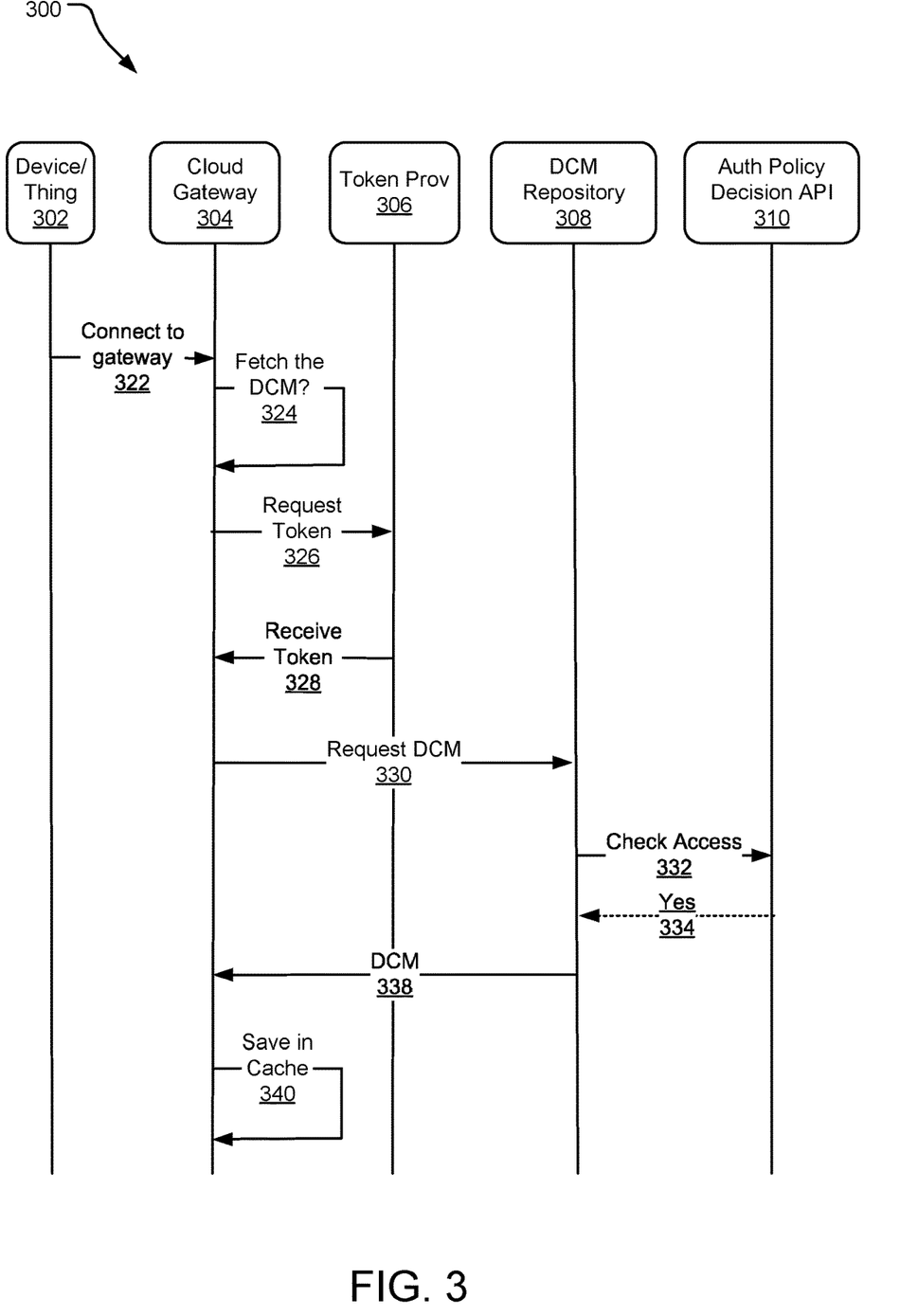
FIG. 3 illustrates an example sequence diagram for accessing DCMs that are stored in the DCM repository.

FIG. 3 illustrates a sequence diagram 300 for accessing device capability models that are stored in the device model repository. Specifically, at 322 a device or a thing (referred to hereinafter as the device 302) may connect to a cloud gateway 304 with a request for a particular DCM. For example, such device 302 may be a microwave that communicates with the cloud gateway 304 to get the DCM for the microwave. At 324, the cloud gateway determines whether it needs to fetch the requested DCM from a DCM repository 308 or if it has the requested DCM in its cache. If it determines that it needs to fetch the requested DCM, at 326, the cloud gateway 304 communicates a request for a token provisioning service 306. In one implementation, the token request 324 may include an application identity and a client secret provisioned at the time of setting up the cloud gateway 304. The client secret may be a private client secret known only to the cloud gateway 304 and the token provisioning service 306. In one implementation, the private client secret may be a 256-bit value generated using a cryptographically-secure library.

In response, at 328, the token provisioning service 306 may respond with a token, such as a JWT token, to the cloud gateway 304. Subsequently, the cloud gateway 304 communicates a request to the DCM repository 308 for the requested DCM. Such a request may include identification of the requested DCM and the token received at 328. Upon receiving the request, at 332 the DCM repository 308, or an API of the DCM repository 308, communicates with an authorization policy decision API 310 to check the access privileges associated with the token received from the cloud gateway 304. The authorization policy decision API 310 returns with confirmation of the access privilege at 334. Upon receiving the confirmation of the access privilege for the cloud gateway 304 to the requested DCM, at 338, the DCM repository 308 communicates the requested DCM to the cloud gateway and at 340, the cloud gateway 304 may store the requested DCM in its cache.

Figure 4:
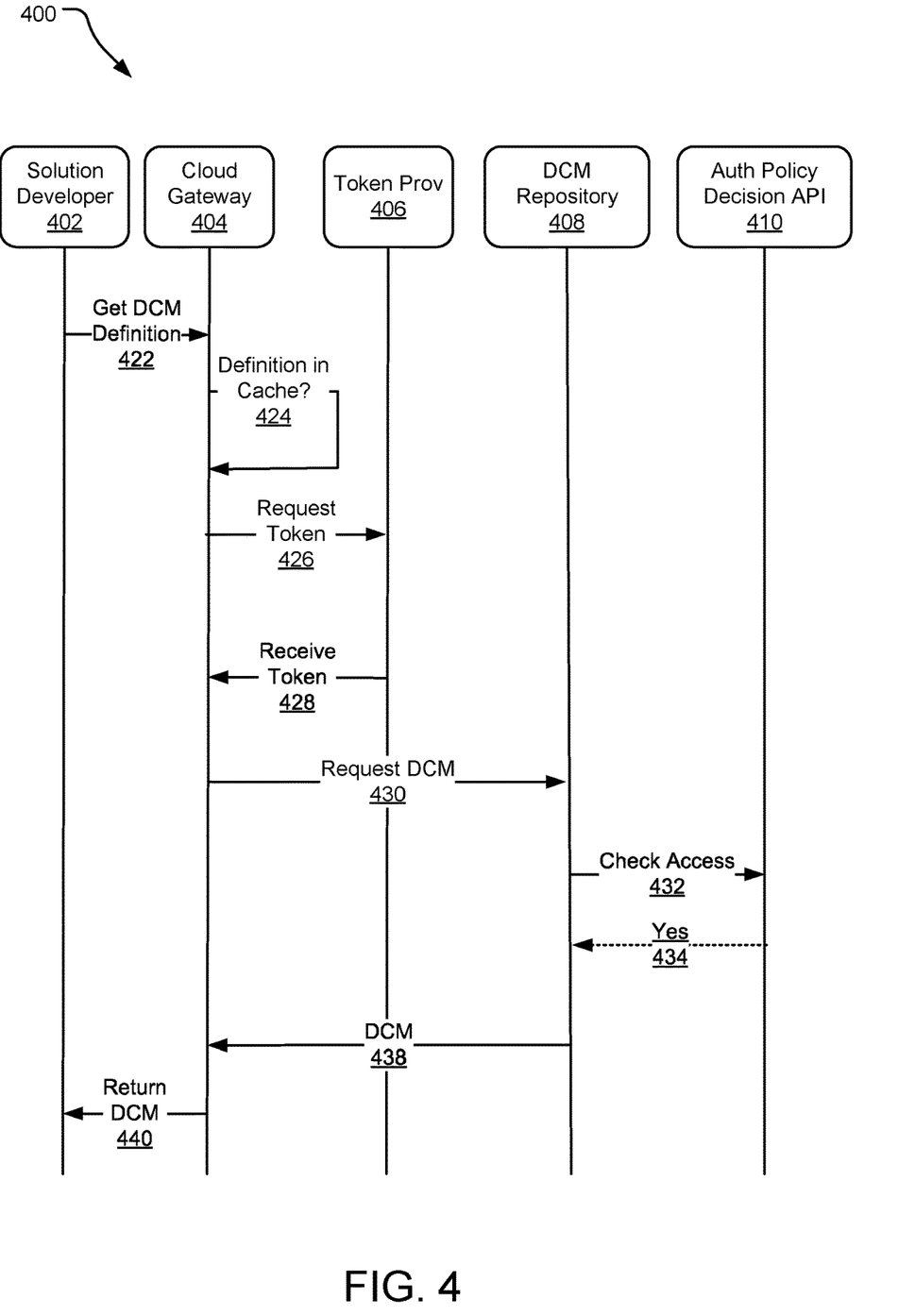
FIG. 4 illustrates an example sequence diagram for accessing a DCM for a solution developer that may not be present in the DCM repository.

FIG. 4 illustrates a sequence diagram 400 for accessing a device capability model that may not be present in the cache of a cloud gateway 404. Specifically, at 422 a solution developer 402 for a device may connect to a cloud gateway 404 with a request for a particular DCM. For example, a solution developer 402 for a microwave may contact the cloud gateway 404 with specific identification for a DCM for the microwave so that the solution developer 402 can develop one or more applications for use of the microwave in an IoT environment.

In response, at 424 the cloud gateway 404 determines if the requested DCM is in its cache. If so, it returns the DCM to the solution developer 402 based on one or more access authorization verifications. If the requested DCM is in the cache of the cloud gateway 404, a sequence of operations 426 to 438 are performed to receive the DCM from a DCM repository. The operations 426 to 438 of the sequence diagram 400 are substantially similar to the operations 326 to 338 of the sequence diagram 300 discussed above.

Specifically, at 426, the cloud gateway 404 communicates a request for a token provisioning service 406. In one implementation, the token request 424 may include an application identity and a client secret provisioned at the time of setting up the cloud gateway 404. The client secret may be a private client secret known only to the cloud gateway 404 and the token provisioning service 406. In one implementation, the private client secret may be a 256-bit value generated using a cryptographically-secure library. In response, at 428, the token provisioning service 406 may respond with a token, such as a JWT token, to the cloud gateway 404. Subsequently, the cloud gateway 404 communicates a request to the DCM repository 408 for the requested DCM. Such a request may include identification of the requested DCM and the token received at 428. Upon receiving the request, at 432 the DCM repository 408, or an API of the DCM repository 408, communicates with an authorization policy decision API 410 to check the access privileges associated with the token received from the cloud gateway 404. The authorization policy decision API 410 returns with confirmation of the access privilege at 434. Upon receiving the confirmation of the access privilege for the cloud gateway 404 to the requested DCM, at 438, the DCM repository 408 communicates the requested DCM to the cloud gateway.

Figure 5:
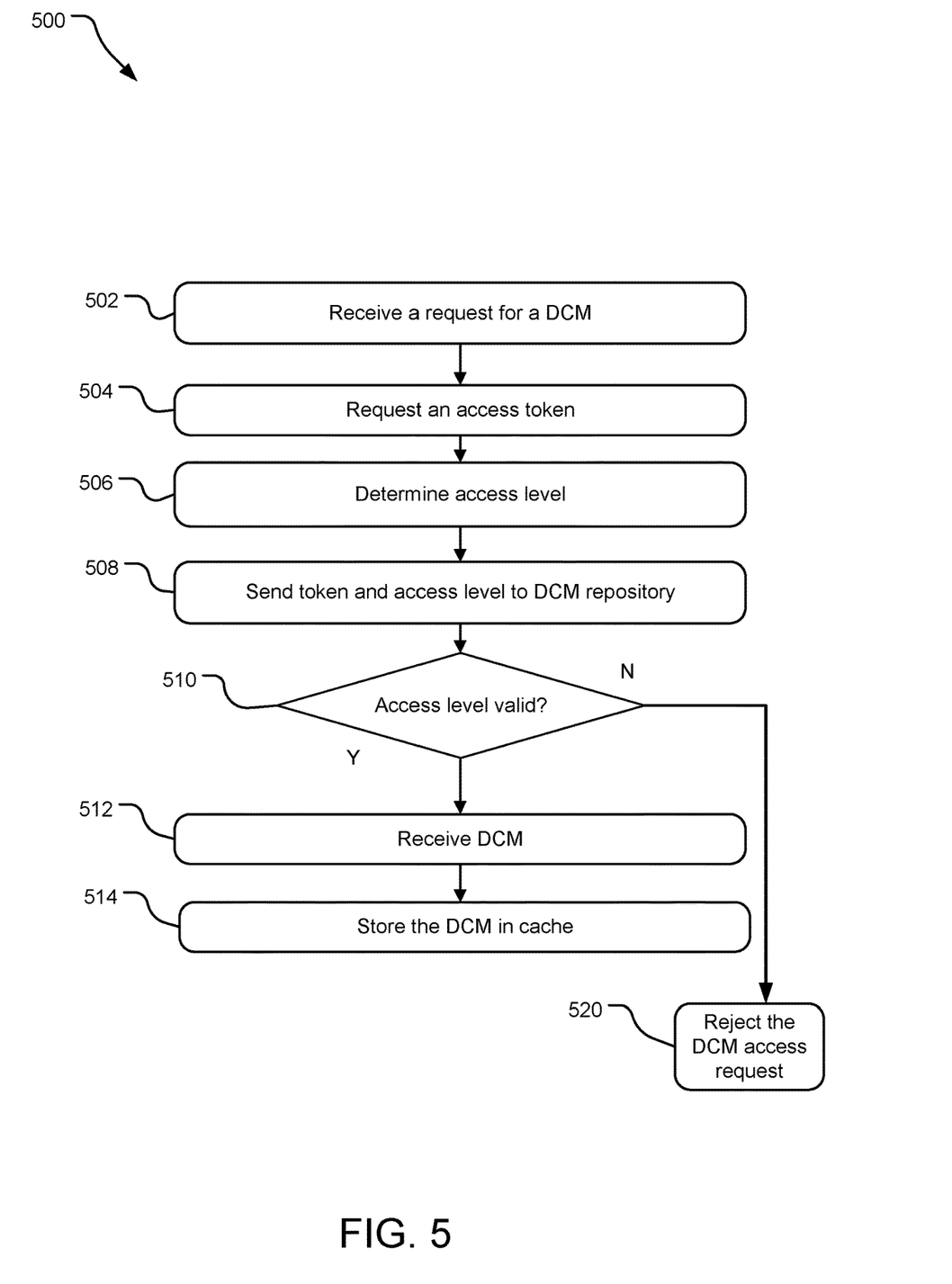
FIG. 5 illustrates example operations for providing a DCM to a device using the device model repository.

FIG. 5 illustrates operations 500 for providing a DCM to a device using the DCM repository. Operation 502 receives a request for a DCM. For example, such a request for a DCM may be received from an IoT device. In response, an operation 504 requests an access token from a token provisioning service. The request for the access token may include identification of the DCM stored on a DCM repository, an identification of the device requesting the DCM, and/or identification of a cloud gateway generating such a token request.

Upon receiving the access token, an operation 506 determines the access level of the device requesting the DCM and communicates the access token and the determined access levels available for the requesting device to a DCM repository. An operation 510 determines if the access level for the device are valid for accessing the requested DCM. If so, an operation 512 receives the DCM from the DCM repository and subsequently, an operation 514 stores the DCM in a cache. If the operation 510 determines that the access level for the device are not valid for accessing the requested DCM, an operation 520 rejects the DCM access request and sends a notification to the requesting device.

Figure 6:
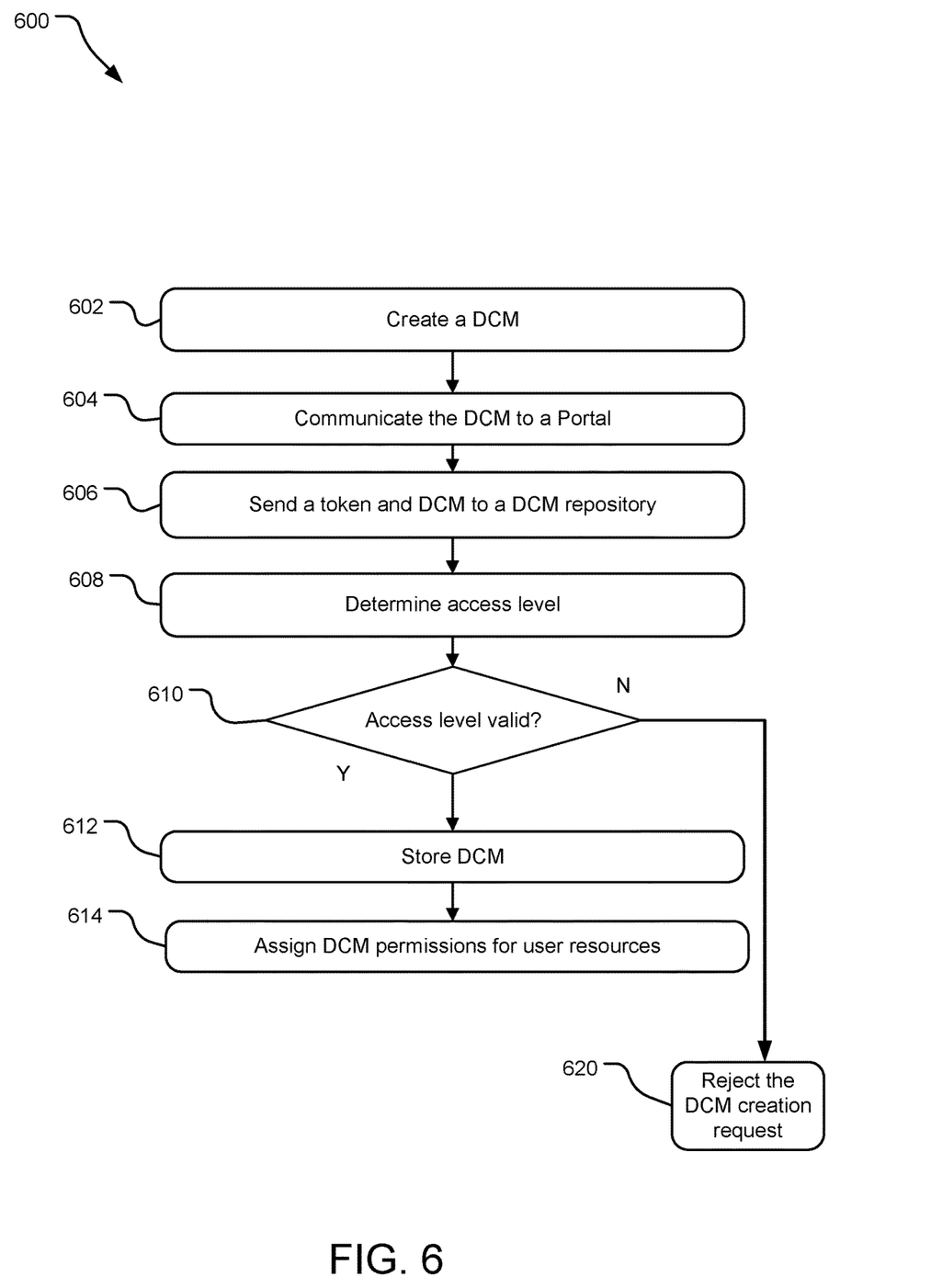
FIG. 6 illustrates example operations for uploading a DCM and assigning permissions thereto.

FIG. 6 illustrates operations 600 for uploading a DCM and assigning permissions thereto. An operation 602 creates a DCM for a device and an operation 604 communicates the DCM to a portal or a cloud gateway. An operation 606 communicates a token associated with the DCM creator and the DCM to a DCM repository. Subsequently, an operation 608 determines the access level associated with the creator of the DCM for the DCM repository. For example, the operation 608 may determine such access level for the DCM creator based on the token associated with the DCM creator.

An operation 610 evaluates the determined access level to determine if the DCM creators access level is valid for storing the DCM in the DCM repository. If so, an operation 612 stores the DCM in a DCM repository. Subsequently, an operation 614 may assign DCM permissions for various user resources. For example, the operation 614 may assign a read level permission to a first cloud gateway whereas it may assign a read and write level permission to another cloud gateway. If the operation 610 determines that the DCM creators access level is not valid for storing the DCM in the DCM repository, an operation 620 rejects the DCM creation request and communicates as such to the DCM creator.

Figure 7:
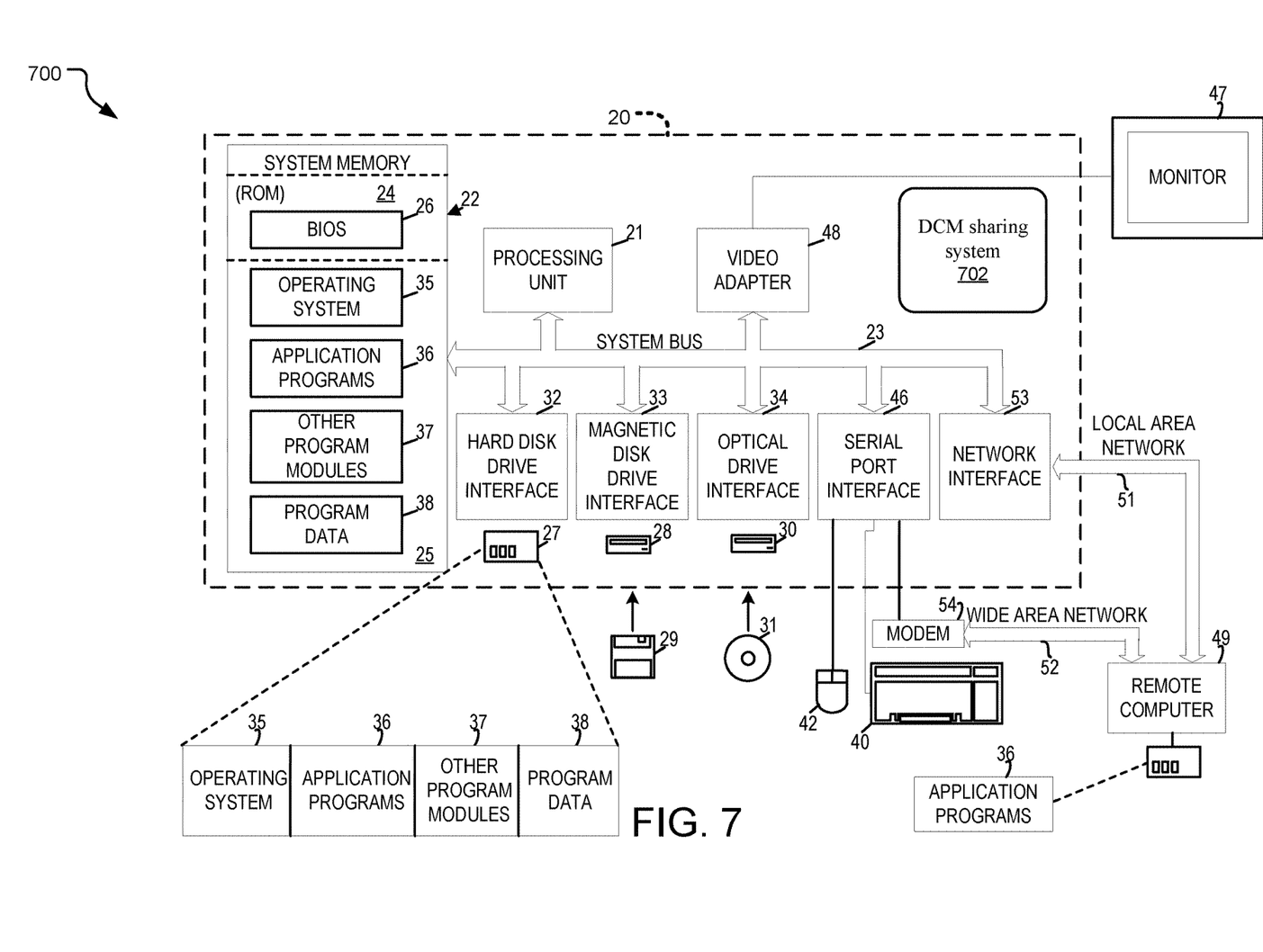
FIG. 7 illustrates an example computing system that may be useful in implementing the described technology.

FIG. 7 illustrates an example system 500 that may be useful in implementing the device capability model sharing system disclosed herein. The example hardware and operating environment of FIG. 7 for implementing the described technology includes a computing device, such as a generalpurpose computing device in the form of a computer 20, a mobile telephone, a personal data assistant (PDA), a tablet, smart watch, gaming remote, or other type of computing device. In the implementation of FIG. 7, for example, the computer 20 includes a processing unit 21, a system memory 22, and a system bus 23 that operatively couples various system components including the system memory to the processing unit 21. There may be only one or there may be more than one processing unit 21, such that the processor of the computer 20 comprises a single central-processing unit (CPU), or a plurality of processing units, commonly referred to as a parallel processing environment. The computer 20 may be a conventional computer, a distributed computer, or any other type of computer; the implementations are not so limited.

The system bus 23 may be any of several types of bus structures including a memory bus or memory controller, a peripheral bus, a switched fabric, point-to-point connections, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM, DVD, or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated tangible computer-readable media provide non-volatile storage of computer-readable instructions, data structures, program modules and other data for the computer 20. It should be appreciated by those skilled in the art that any type of tangible computer-readable media may be used in the example operating environment.

A number of program modules may be stored on the hard disk drive 27, magnetic disk 28, optical disk 30, ROM 24, or RAM 25, including an operating system 35, one or more application programs 36, other program modules 37, and program data 38. A user may generate reminders on the personal computer 20 through input devices such as a keyboard 40 and pointing device 42. Other input devices (not shown) may include a microphone (e.g., for voice input), a camera (e.g., for a natural user interface (NUI)), a joystick, a game pad, a satellite dish, a scanner, or the like. These and other input devices are often connected to the processing unit 21 through a serial port interface 46 that is coupled to the system bus 23, but may be connected by other interfaces, such as a parallel port, game port, or a universal serial bus (USB) (not shown). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the implementations are not limited to a particular type of communications device. The remote computer 49 may be another computer, a server, a router, a network PC, a client, a peer device or other common network node, and typically includes many or all of the elements described above relative to the computer 20. The logical connections depicted in FIG. 10 include a local-area network (LAN) 51 and a wide-area network (WAN) 52. Such networking environments are commonplace in office networks, enterprise-wide computer networks, intranets and the Internet, which are all types of networks.

When used in a LAN-networking environment, the computer 20 is connected to the local network 51 through a network interface or adapter 53, which is one type of communications device. When used in a WAN-networking environment, the computer 20 typically includes a modem 54, a network adapter, a type of communications device, or any other type of communications device for establishing communications over the wide area network 52. The modem 54, which may be internal or external, is connected to the system bus 23 via the serial port interface 46. In a networked environment, program engines depicted relative to the personal computer 20, or portions thereof, may be stored in the remote memory storage device. It is appreciated that the network connections shown are examples and other means of communications devices for establishing a communications link between the computers may be used.

In an example implementation, software or firmware instructions for a device capability model sharing system may be stored in memory 22 and/or storage devices 29 or 31 and processed by the processing unit 21. One or more ML, NLP, or DLP models disclosed herein may be stored in memory 22 and/or storage devices 29 or 31 as persistent datastores. For example, a device capability model sharing system 702 may be implemented on the computer 20 as an application program 36 (alternatively, the device capability model sharing system 702 may be implemented on a server or in a cloud environment). The device capability model sharing system 702 may utilize one of more of the processing unit 21, the memory 22, the system bus 23, and other components of the personal computer 20.

In contrast to tangible computer-readable storage media, intangible computer-readable communication signals may embody computer readable instructions, data structures, program modules or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include wired media such as a wired network or direct-wired connection, and wireless media such as acoustic, RF, infrared and other wireless media.

One or more tangible computer-readable storage media encoding computer-executable instructions for executing on a computer system a computer process, the computer process including receiving a request from a device for access to a device capability model (DCM), generating a request to a token issuing authority to request a device identification token, evaluating the device identification token to determine the device's DCM access level, communicating the device identification token with the device's DCM access level to a DCM repository, receiving the DCM from the DCM repository, and providing the device access to the DCM.

In one implementation, the DCM specifies one or more parameters for the device to communicate with a cloud-based device management application. In an alternative implementation, the one or more parameters specifies a telemetry for the device to communicate with the cloud-based device management application. In another implementation, the one or more parameters specifies a command format for the device to communicate with the cloud-based device management application. Alternatively, the one or more parameters specifies an access termination period for the device's access to the cloud-based device management application. Yet alternatively, the computer process further comprises storing a fingerprint of the DCM at a cache of a cloud gateway.

In one implementation, the computer process further includes receiving a request from the cloud gateway to perform an integrity check of the DCM, the request including the fingerprint of the DCM and in response to the request from a device to perform an integrity check, validating the DCM based on the fingerprint of the DCM. Alternatively, the computer process further includes receiving a request from a solution developer to receive the DCM; and in response to determining that the DCM is in the cache, communicating the DCM to the solution developer.

A method disclosed herein includes receiving a DCM and a DCM creator identification from a DCM creator, determining the DCM creator's access level to a DCM repository, in response to determining that the DCM creator's access level to the DCM depository is valid; storing the DCM in the DCM depository, receiving one or more permissions levels for various user resources' access to the DCM, associating the one or more permissions with identifications of the various user resources at an authorization policy assignment application programming interface (API), and sharing the DCM from the DCM repository with the various user resources based on verification of their access permission levels.

In one implementation, the authorization policy assignment API uses a token issued by a token provisioning service to share the DCM with the various user resources. Alternatively, the DCM specifies one or more parameters for the device to communicate with a cloud-based device management application. Yet alternatively, the one or more parameters specifies a telemetry for the device to communicate with the cloud-based device management application. In another implementation, the one or more parameters specifies an access termination period for a device's access to the cloud-based device management application.

In one implementation, the method further includes storing a fingerprint of the DCM at a cache, receiving a request from the cloud gateway to perform an integrity check of the DCM, the request including the fingerprint of the DCM, and in response to the request from a device to perform an integrity check, validating the DCM based on the fingerprint of the DCM.

A system disclosed herein includes a memory, one or more processing units, and a cloud-based DCM sharing system stored in the memory and executable by the one or more processor units, the DCM sharing system encoding computer-executable instructions on the memory for executing on the one or more processor units a computer process, the computer process including receiving a request from a device for access to a device capability model (DCM), generating a request to a token issuing authority to request a device identification token, evaluating the device identification token to determine the device's DCM access level, communicating the device identification token with the device's DCM access level to a DCM repository, receiving the device capability model from the DCM repository, and storing the DCM in a cache.

Alternatively, the computer process further includes storing a fingerprint of the DCM at a cache of a cloud gateway, receiving a request from the cloud gateway to perform an integrity check of the DCM, the request including the fingerprint of the DCM, and in response to the request from a device to perform an integrity check, validating the DCM based on the fingerprint of the DCM. Yet alternatively, the computer process further includes receiving a request from a solution developer to receive the DCM and in response to determining that the DCM is in the cache, communicating the DCM to the solution developer. Alternatively, the DCM specifies one or more parameters for the device to communicate with a cloud-based device management application. Yet alternatively, the one or more parameters specifies a command format for the device to communicate with the cloud-based device management application.

The implementations described herein are implemented as logical steps in one or more computer systems. The logical operations may be implemented (1) as a sequence of processor-implemented steps executing in one or more computer systems and (2) as interconnected machine or circuit modules within one or more computer systems. The implementation is a matter of choice, dependent on the performance requirements of the computer system being utilized. Accordingly, the logical operations making up the implementations described herein are referred to variously as operations, steps, objects, or modules. Furthermore, it should be understood that logical operations may be performed in any order, unless explicitly claimed otherwise or a specific order is inherently necessitated by the claim language.

The above specification, examples, and data provide a complete description of the structure and use of exemplary embodiments of the invention. Since many implementations of the invention can be made without departing from the spirit and scope of the invention, the invention resides in the claims hereinafter appended. Furthermore, structural features of the different embodiments may be combined in yet another implementation without departing from the recited claims.

What is claimed is:

1. One or more tangible computer-readable storage media encoding computer-executable instructions for executing a computer process on a computer system, the computer process comprising:
   receiving a request from a device for access to a device capability model (DCM), wherein the DCM specifies a telemetry field that defines how the device communicates with a cloud-based device management application;
   requesting a device identification token by generating a request to a token service;
   determining a DCM access level of the device by evaluating the device identification token; and
   communicating the device identification token and the DCM access level to a DCM repository.

2. The one or more tangible computer-readable storage media of claim 1, wherein the telemetry field further specifies one or more parameters for the device to communicate with the cloud-based device management application.

3. The one or more tangible computer-readable storage media of claim 2, wherein the computer process further comprises receiving the DCM from the DCM repository and providing the device access to the DCM.

4. The one or more tangible computer-readable storage media of claim 2, wherein the telemetry field further specifies a command format for the device to communicate with the cloud-based device management application.

5. The one or more tangible computer-readable storage media of claim 2, wherein the telemetry field further specifies an access termination period for the device's access to the cloud-based device management application.

6. The one or more tangible computer-readable storage media of claim 1, wherein the computer process further comprises storing a fingerprint of the DCM at a cache of a cloud gateway.

7. The one or more tangible computer-readable storage media of claim 6, wherein the computer process further comprising:
receiving a request from the cloud gateway to perform an integrity check of the DCM, the request including the fingerprint of the DCM; and
in response to the request from a device to perform an integrity check, validating the DCM based on the fingerprint of the DCM.

8. The one or more tangible computer-readable storage media of claim 6, wherein the computer process further comprises:
receiving a request from a solution developer to receive the DCM; and
in response to determining that the DCM is in the cache, communicating the DCM to the solution developer.

9. A method, comprising:
receiving a DCM and an access token identifying a DCM developer, wherein the DCM specifies an access termination period for a device's access to a cloud-based device management application;
determining an access level for the DCM developer to a DCM repository;
in response to determining that the access level to the DCM repository is valid; storing the DCM in the DCM repository;
receiving one or more permissions levels for access by various user resources to the DCM; and
associating the one or more permissions levels with identifications of the various user resources at an authorization policy assignment application programming interface (API).

10. The method of claim 9, wherein the authorization policy assignment API uses a token issued by a token provisioning service to share the DCM with the various user resources.

11. The method of claim 9, wherein the DCM further specifies one or more parameters for the device to communicate with the cloud-based device management application.

12. The method of claim 11, wherein the one or more parameters specifies a telemetry for the device to communicate with the cloud-based device management application.

13. The method of claim 11, wherein the one or more parameters specifies a command format for the device to communicate with the cloud-based device management application.

14. The method of claim 11, wherein the computer process further comprises sharing the DCM from the DCM repository with the various user resources based on verification of their access permission levels.

15. The method of claim 9, further comprising:
storing a fingerprint of the DCM at a cache;
receiving a request from a cloud gateway to perform an integrity check of the DCM, the request including the fingerprint of the DCM; and
in response to the request from a device to perform an integrity check, validating the DCM based on the fingerprint of the DCM.

16. A system comprising:
memory;
one or more processor units;
a cloud-based DCM sharing system stored in the memory and executable by the one or more processor units, the DCM sharing system encoding computer-executable instructions on the memory for executing a computer process on the one or more processor units, the computer process comprising:
receiving a request from a device for access to a device capability model (DCM), wherein the DCM specifies a command format for the device to communicate with a cloud-based device management application;
requesting a device identification token by generating a request to a token service;
determining a DCM access level of the device by evaluating the device identification token; and
communicating the device identification token and the DCM access level to a DCM repository.

17. The system of claim 16, wherein the computer process further comprises:
storing a fingerprint of the DCM at a cache of a cloud gateway;
receiving a request from the cloud gateway to perform an integrity check of the DCM, the request including the fingerprint of the DCM; and
in response to the request from a device to perform an integrity check, validating the DCM based on the fingerprint of the DCM.

18. The system of claim 17, wherein the computer process further comprising:
receiving a request from a solution developer to receive the DCM; and
in response to determining that the DCM is in the cache, communicating the DCM to the solution developer.

19. The system of claim 16, wherein the DCM further specifies one or more parameters for the device to communicate with a cloud-based device management application.

20. The system of claim 19, wherein the computer process further comprises receiving the device capability model from the DCM repository and storing the DCM in a cache.

* * * * *